United States Patent Office 3,467,679
Patented Sept. 16, 1969

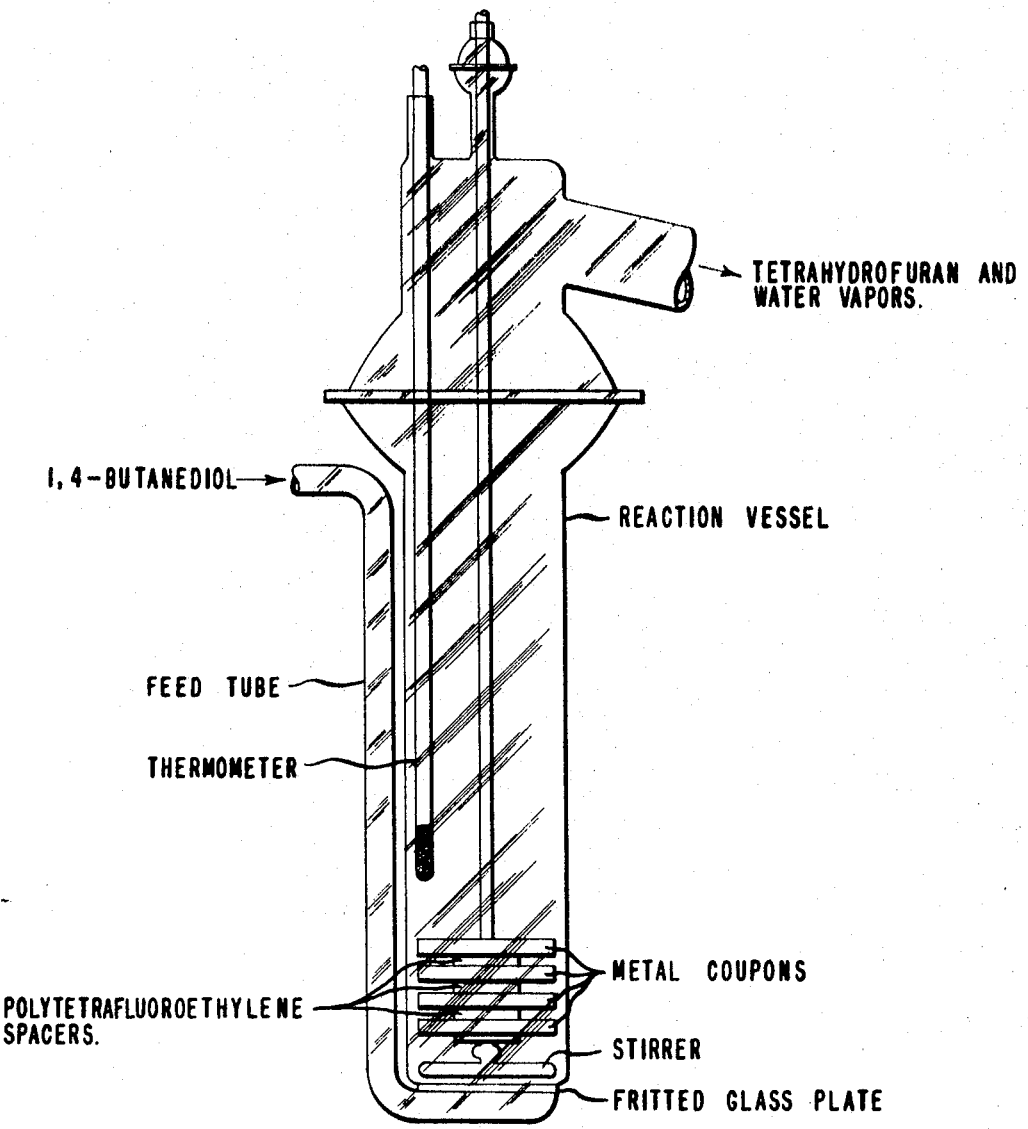

3,467,679
PRODUCTION OF TETRAHYDROFURAN FROM 1,4-BUTANEDIOL
Arthur O. Rogers, Lewiston, N.Y., assignor to E. I. du Pont de Nemours and Company, Wilmington, Del., a corporation of Delaware
No Drawing. Filed Mar. 21, 1966, Ser. No. 535,834
Int. Cl. C07d 5/02; C08f 27/06
U.S. Cl. 260—346.1     5 Claims

ABSTRACT OF THE DISCLOSURE 1,4-butanediol is catalytically converted to tetrahydrofuran by heating at 100–150° C. in the presence of an acidic nuclear sulfonated cross-linked aromatic hydrocarbon cation exchange resin. Corrosion of metal equipment is much less with such catalysts than with soluble strong acid catalysts. The presence of a basic anion exchange resin having functional amine or quaternary ammonium groups along with the acidic resin catalyst reduces corrosion further so that the conversion can be practically carried out in carbon steel or cast iron equipment.

---

This invention relates to the production of tetrahydrofuran and provides an improved method for its production from 1,4-butanediol.

It is known that various acidic compounds catalyze the conversion of 1,4-butanediol to tetrahydrofuran (Reppe et al., Ann. 596, 81, 82, 109 (1955)). In order to obtain reaction rates satisfactory for continuous operation at atmospheric pressure, it has been necessary to employ as catalysts strong acids, e.g., sulfuric acid (German Patent 1,043,342). However, use of such acids is disadvantageous in that they are highly corrosive towards those metals most commonly used for constructing chemical processing equipment. The use of sulfonic acid cation exchange resins of the phenol-formaldehyde type is mentioned by Reppe et al. (loc. cit., p. 109) and by Swistak et al. (Compt. rend. 240, 1544 (1955); Compt. rend. 239, 709 (1954)). However, these workers employed temperatures of from 160 to 250° C., at which temperatures the resin catalysts they employed decompose so rapidly as to be impractical for commercial use.

It has now been discovered that acidic cation exchange resins which are nuclear sulfonated cross-linked aromatic hydrocarbon resins are highly effective catalysts for converting 1,4-butanediol to tetrahydrofuran and can be used efficiently for effecting such conversion at temperatures of 100 to 150° C., at which temperatures these resin catalysts are sufficiently stable to make their use highly attractive. Furthermore, in contrast to soluble strong acid catalysts such as sulfuric acid, the above acidic sulfonated aromatic hydrocarbon resin catalysts are sufficiently non-corrosive to permit operation of the conversion process in stainless steel equipment with negligible equipment corrosion.

It has been further discovered that if such an acidic nuclear sulfonated aromatic hydrocarbon resin catalyst is employed together with a minor proportion of an anion exchange resin having amine functional groups, the corrosivity of the acidic resin catalyst is so reduced as to permit operation of the conversion process in ordinary carbon steel or cast iron equipment with negligible equipment corrosion.

Accordingly, the method of the invention comprises heating 1,4-butanediol, generally to a temperature of from about 100° C. to about 150° C., preferably at 110 to 135° C. in the presence of an amount effective to catalyze the conversion of the 1,4-butanediol to tetrahydrofuran of an acid nuclear sulfonated cross-linked aromatic hydrocarbon cation exchange resin, and recovering the tetrahydrofuran produced. Preferably, the conversion is carried out in a continuous operation in which tetrahydrofuran and water are continuously distilled as they are formed from a reaction mixture comprising 1,4-butanediol and the resin catalyst, while continuously adding to the reaction mixture fresh 1,4-butanediol to replace that consumed in the reaction.

In a preferred embodiment of the invention, there is employed along with the acidic nuclear sulfonated cross-linked aromatic hydrocarbon cation exchange resin catalyst a minor amount (relative to the resin catalyst) of an anion exchange resin having functional amine or quaternary ammonium groups, which resin is employed in its basic amine or hydroxide form, respectively. Surprisingly, even though such anion exchange resins are basic, the presence thereof in the reaction mixture containing the acidic nuclear sulfonated aromatic hydrocarbon resin does not significantly reduce the effectiveness of the latter in catalyzing the conversion reaction. Furthermore, use of such a basic resin along with the acidic resin catalyst is decidedly advantageous in that it makes it commercially practical to carry out the conversion process in common carbon steel or cast iron equipment, instead of having to resort to stainless steel or even more costly construction materials to gain satisfactory corrosion resistance.

The proportion of the basic resin to the acidic catalyst resin is not critical and from about 5 to about 25% of the basic resin, based upon the weight of the acidic catalyst resin, generally gives excellent results. However, as little as 0.5% of the basic resin will significantly reduce the corrosion rate.

Any of the nuclear sulfonated cross-linked aromatic hydrocarbon resins commonly employed for cation exchange purposes can be used in their acidic or hydrogen form as the reaction catalyst. Such resins include the sulfonated polyvinyl aromatic hydrocarbon resins and the sulfonated copolymers of a monovinyl aromatic hydrocarbon and a polyvinyl aromatic hydrocarbon, the latter serving as the cross-linking agent. Examples of polyvinyl aromatic hydrocarbons usable in preparing the aromatic hydrocarbon matrix of such resins are the divinylbenzenes, the divinyltoluenes, the divinylxylenes and the divinylnaphthalenes. Examples of monovinyl aromatic hydrocarbons which are copolymerizable with such polyvinyl aromatic hydrocarbons in preparing aromatic hydrocarbon matrixes which can be sulfonated to yield the acidic resin catalysts used in practicing the invention are styrene, the monovinyltoluenes, the monovinylxylenes and the monovinylnaphthalenes. Such nuclear sulfonated cross-linked aromatic hydrocarbon resins and their preparation are described in D'Alelio, U.S. Patent 2,366,007. The sulfonated copolymers of styrene and divinylbenzene are available commercially and constitute the preferred catalysts. The matrixes of such commercial resins nominally contain from about 4 to 16% divinylbenzene, which functions as the cross-linking agent. Some of the commercial sulfonated styrene-divinylbenzene resins of this type which are usable in their acidic form as catalysts for the present purpose are available under the trade names "Dowex" 50, "Amberlite" IR-120 and "Amberlyst" 15, the latter being a macroporous product.

Any of the commercially available anion exchange resins having amine or quaternary ammonium functional groups can be used in their basic form along with the acidic cation exchange resin catalyst in practicing the method of the invention. However, the weakly basic or amine type anion exchange resins are preferred over the strongly basic or quaternary ammonium type since they possess better thermal stability. A preferred class of weakly basic anion exchange resins are those obtained by reacting a cross-linked copolymer of an ester of acrylic or methacrylic acid and a polyvinyl aromatic hydrocarbon such as divinylbenzene, a divinyltoluene or the like, with a polyamine which contains at least one primary amino group. Anion exchange resins of this type and their preparation are described in Schneider, U.S. Patent 2,675,359. A typical resin of this type containing functional tertiary amino groups is available commercially under the trade name "Amberlite" IRA-68.

Suitable weakly basic anion exchange resins of another type and their preparation are described in McBurney, U.S. Patent 2,591,574. They are produced by reacting a haloalkylated copolymer of a monovinyl aromatic hydrocarbon and a polyvinyl aromatic hydrocarbon, e.g., a styrene-divinylbenzene copolymer, with a primary or a secondary amine. A typical resin of this type containing functional amine groups is available commercially under the trade name "Amberlite" IRA-45. Other usable weakly basic anion resins are the aldehyde condensation products of a polyamine and urea whose preparation is described in Dudley, U.S. Patent 2,485,485.

Illustrative of the usable quaternary ammonium type strongly basic anion exchange resins are those described in McBurney, U.S. Patent 2,591,573. They are obtained by reacting a haloalkylated copolymer of a monovinyl aromatic hydrocarbon and a polyvinyl aromatic hydrocarbon, e.g., a styrene-divinylbenzene copolymer, with a tertiary amine. Strongly basic anion exchange resins of this type are available commercially under the trade names "Amberlite" IRA-400 and "Amberlite" IRA-410.

In practicing the present process, the 1,4-butanediol can be added at a suitable rate to a bed or body of the acidic resin catalyst in granular form maintained at a temperature of about 100 to 150° C., from which bed or body the tetrahydrofuran and water are distilled out as they are formed. However, it is generally preferred that the butanediol be added to a slurry of the granular catalyst in butanediol, which slurry is maintained at a temperature consistent with the desired rate of conversion. Pressure seems not to be critical and although pressures above and below atmospheric pressure can be used, operation at about atmospheric pressure is entirely satisfactory and preferred.

When using the slurry type reaction mixture, stirring is not essential but is highly desirable in that it helps to maintain a steady distillation rate and to avoid bumping. The proportion of acidic resin catalyst to liquid in the slurry reaction mixture is not critical; however, since the rate of reaction, i.e., the conversion of the butanediol to tetrahydrofuran, is approximately directly proportional to the amount of the catalyst present, the productivity per unit volume of reaction mixture increases with increasing resin catalyst:liquid ratios. It is accordingly desirable to have as high a resin catalyst:liquid ratio as will permit effective catalyst-liquid contact. Acidic resin catalyst:liquid weight ratios for the reaction mixture ranging from about 0.2 to 2:1 are highly satisfactory. Ratios lower than about 0.05:1, though operable, generally result in such low productivities per unit volume of reaction mixture as to be unattractive. The above resin catalyst:liquid weight ratios are based upon the weight of the resin catalyst in its commercial form which includes absorbed water. The liquid portion of the reaction mixture will consist essentially of 1,4-butanediol, water and tetrahydrofuran, but may include, with continued use, some tarry by-products. Aside from small amounts of such tarry by-products, the butanediol feed is converted essentially quantitatively to tetrahydrofuran and water in accordance with the equation:

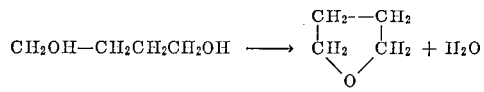

Although water tends to depress the reaction rate and increases the heat in-put requirements by that amount necessary to vaporize the water, relatively small proportions of water, e.g., up to about 20% by weight, may be present in the butanediol feed without seriously impeding the reaction. Inert impurities substantially less volatile than water are advantageously avoided since they tend to accumulate in the reaction mixture and can eventually stop the reaction unless part of the reaction mixture is continuously or intermittently removed at a rate effective to prevent undue build-up of the concentration of such inert impurities in the reaction mixture. Bases, such as sodium, calcium and ammonium hydroxides and acid acceptors such as salts of weak or volatile acids such as calcium carbonate and sodium acetate, should be avoided since they react with the acidic resin catalyst and reduce or destroy its catalytic activity. Salts of strong acids such as calcium chloride and sodium sulfate should also be avoided since they react with the acidic resins to liberate the corresponding strong acids and thus increase the corresiveness of the mixture. As noted above, however, the insoluble anion exchange resins having functional amine groups do not significantly reduce the activity of the acidic resin catalysts, and their beneficial action to suppress corrosion of metal equipment is believed to be due to their ability to remove traces of soluble acids which tend to form in the reaction mixture.

The invention is illustrated by the following examples. In the examples and elsewhere herein, all quantities expressed as parts or percentages are by weight unless stated to be otherwise.

EXAMPLE 1

A small round-bottomed glass flask was charged with 17 g. (calculated as the commercial form) of the acid form of "Dowex" 50W-X4 resin, a commercial sulfonated styrene-divinylbenzene cation exchange resin whose aromatic hydrocarbon matrix had a nominal divinylbenzene content of 4%. The resin had been previously soaked in 1,4-butanediol and filtered but not dried. 1,4-butanediol was added to the flask to bring the total contents thereof to 25 ml. The resin-butanediol mixture was heated in an oil bath with stirring. The tetrahydrofuran and water formed were removed as vapor through a short Vigreux column while additional 1,4-butanediol was added as required to maintain the reaction mixture at a constant level in the flask. During one hour's operation with the reaction mixture maintained at 130 to 132° C., 152 g. of distillate, consisting of 122 g. tetrahydrofuran and 30 g. water, was obtained, corresponding to a space-time-yield of 7200 lbs. tetrahydrofuran per day per cubic foot of reaction mixture.

The following Examples 2 through 4 were carried out using apparatus illustrated in the accompanying sketch. The sketch shows diagrammatically a cylindrical glass reaction vessel provided with a stirrer on whose shaft are mounted metal coupons separated from each other by polytetrafluoroethylene spacer rings. In starting any given run, a slurry of the acidic resin catalyst in 1,4-butanediol was charged to the reaction vessel and while the charge was stirred and maintained at the desired temperature, 1,4-butanediol was fed by gravity from a constant level reservoir (not shown in the sketch) into the reaction vessel through a sintered glass plate at the bottom thereof. The rate of feed was such as to keep the contents of the reaction vessel at a constant level. The vapors of water and tetrahydrofuran formed were taken off overhead continuously and led to a condenser (not shown in the sketch) for recovery.

EXAMPLE 2

The reaction vessel of the sketch was charged with a slurry of "Dowex" 50W–4X cation exchange resin (acid form) in 1,4-butanediol. Coupons of the metals indicated below were inserted on the stirrer shaft and the process was operated continuously for 6 hours while maintaining the reaction mixture at 127–129° C. Tetrahydrofuran was produced at an average rate of about 5000 lbs. per day per cubic foot of reaction mixture. The losses in weight of the metal coupons indicated the following corrosion rates.

| Metal coupon: | Corrosion rate, in./yr. |
| --- | --- |
| S.A.E. 1018 carbon steel | 0.71 |
| Nickel | 0.011 |
| "Hastelloy" B | Nil |
| 304 stainless steel | Nil |
| 316 stainless steel | Nil |

EXAMPLE 3

A run similar to that of Example 2 was carried out except that the operating temperature was 116–117° C. and the resin catalyst used was "Dowex" 50W–X8, which was a sulfonated styrene divinylbenzene resin whose aromatic hydrocarbon matrix had a nominal divinylbenzene content of 8%. The initial charge to the reaction vessel was 75 ml. of the commercial resin and sufficient of the butanediol to give a total volume of 76 ml. Tetrahydrofuran was produced during the 6 hours of operation at an average rate of 1500 lbs. per day per cubic foot of reaction mixture. Coupons of S.A.E. 1018 carbon steel, cast iron and Monel metal mounted on the shaft of the stirrer during the run suffered weight losses corresponding ot corrosion rates in inches per year of 0.93, 0.64 and 0.004, respectively.

EXAMPLE 4

A run similar to that of Example 2 was carried out except that the initial charge to the reaction vessel consisted of 60 ml. of "Dowex" 50W–X8 cation exchange resin (acid form), 10 ml. of "Amberlite" IRA–68 anion exchange resin (amine form), and the reaction mixture was maintained at 116–120° C. During the 5.5-hour duration of the run, tetrahydrofuran was produced at an average rate of 1300 lbs. per day per cubic foot of reaction mixture. Coupons of S.A.E. 1018 carbon steel and cast iron mounted on the stirrer shaft during the run suffered weight losses corresponding to corrosion rates in inches per year of 0.049 and 0.085, respectively.

In a repeat of the above run at 117–118° C. but using 40 g. of the "Dowex" 50W–X8 and 0.4 g. of the "Amberlite" IRA–68 resins in the initial charge, the carbon steel and cast iron coupons suffered weight losses equivalent to corrosion rates in inches per year of 0.061 and 0.094, respectively.

EXAMPLE 5

A reaction vessel similar to that used in Examples 2–4 was charged with 24.8 g. "Dowex" 50W–X8 cation exchange resin (acid form), 3.7 g. "Amberlite" IRA–68 anion exchange resin (amine form) and sufficient 1,4-butanediol to give a total volume of 50 ml. The reaction was operated continuously for 166 hours by distilling out the tetrahydrofuran and water as they were formed and continuously feeding fresh 1,4-butanediol as required to keep the level of the reaction mixture constant. The reaction mixture at the beginning of the run was maintained at 119° C. during which time the space-time-yield of tetrahydrofuran was about 1600 lbs. per day per cubic foot of reaction mixture. The gradual accumulation of by-product tars in the reaction mixture caused a slow decrease in productivity as the run progressed which was compensated for by raising the temperature as required until the temperature at the end of the run was 139° C. The average space-time-yield was 1400 lbs./day/cu. ft. and a total of 7.7 kg. of tetrahydrofuran was produced. Except for the by-product tars, essentially all of the butanediol fed was converted to tetrahydrofuran and water. A coupon of S.A.E. 1018 carbon steel immersed in the reaction mixture during the run corroded at an average rate of 0.029 in./yr.

EXAMPLE 6

A steam-jacketed cast iron reaction vessel was charged to 75% of its capacity with 3200 parts of 1,4-butanediol, 1300 parts of "Dowex" 50W–X8 in acid form and 135 parts of "Amberlite" IRA–68 in amine form. The mixture was heated with stirring beginning at 110° C. and gradually raising the temperature to 135° C. to maintain a substantially constant production rate, while adding 1,4-butanediol to replace that consumed. Tetrahydrofuran was produced at the rate of about 1000–1500 parts per hour. The crude product containing an equimolar proportion of water was dehydrated and refined by distillation to give tetrahydrofuran of high purity. The yield was 95 to 98% based on the butanediol and catalyst consumption amounted to about 1 part per 400 parts of tetrahydrofuran produced. No significant corrosion of the vessel was observed during several months' operation.

The embodiments of the invention in which an exclusive property or privilege is claimed are as follows:

1. The method of producing tetrahydrofuran comprising heating 1,4-butanediol at a temperature of from about 100° C. to about 150° C. in a vessel constructed of stainless steel, Monel metal, nickel, carbon steel or cast iron; said heating being effected in the absence of inorganic bases and of salts of weak or strong acids but in the presence of: (a) a nuclear sulfonated cross-linked aromatic hydrocarbon cation exchange resin in its acid form in an amount effective to catalyze the conversion of said 1,4-butanediol to tetrahydrofuran and (b) an anion exchange resin containing functional amino or quaternary ammonium groups, which anion exchange resin is in its basic amine or hydroxide form, respectively, and is present in an amount equal to 0.5 to 25% of the weight of said cation exchange resin present; and recovering the tetrahydrofuran produced.

2. The method of claim 1 wherein the cation exchange resin is a sulfonated copolymer of styrene and divinylbenzene and the anion exchange resin is a weakly basic anion exchange resin having functional amino groups.

3. The method of claim 1 wherein the cation exchange resin is a sulfonated copolymer of styrene and divinylbenzene and the anion exchange resin is the reaction product of a polyamine having at least one primary amino group and a cross-linked copolymer of an ester of acrylic or methacrylic acid and divinylbenzene.

4. The method of claim 1 wherein a slurry of the cation exchange resin and the anion exchange resin in 1,4-butanediol is maintained at a temperature from about 110 to about 135° C., from which slurry the product tetrahydrofuran is continuously distilled as it is produced, and to which slurry fresh 1,4-butanediol is continuously fed as required to maintain the volume of said slurry substantially constant, said cation exchange resin being present in said slurry in an amount such that the weight ratio of said cation exchange resin to the liquid portion of said slurry is from 0.05–2:1.

5. The method of claim 4 wherein the slurry contains as the cation exchange resin a sulfonated copolymer of styrene and divinylbenzene, and an anion exchange resin which is the reaction product of a polyamine containing at least one primary amino group and a cross-link copolymer of an ester of acrylic or methacrylic acid and divinylbenzene.

References Cited

FOREIGN PATENTS 850,750  9/1952  Germany.

OTHER REFERENCES

Swistak et al.: Compte rendu, vol. 239, pp. 709–11 (1954).

Swistak: Compte rendu, vol. 240, pp. 1544–5 (1955).

Reppe et al.: Annalen., vol. 596, pp. 80–83 and 109 (1955).

Kressman: Chemistry and Industry, p. 64, Jan. 21, 1956, pp. 64–65.

Helfferich: Ion Exchange, McGraw-Hill, New York, (1962), pp. 30–35.

ALEX MAZEL, Primary Examiner

BERNARD I. DENTZ, Assistant Examiner

U.S. Cl. X.R.

252—426; 260—2.1